(12) United States Patent
Leroy et al.

(10) Patent No.: US 11,912,262 B2
(45) Date of Patent: Feb. 27, 2024

(54) VEHICLE AIR CONDITIONING TORQUE RESERVE VIA BELT INTEGRATED STARTER GENERATOR

(71) Applicant: Ford Global Technologies, LLC, Dearborn, MI (US)

(72) Inventors: Tom Leroy, Dagenham (GB); Nicholas Dashwood Crisp, Benfleet (GB); Athul Raj, Wickford (GB); Grant Cooper, Rochester (GB)

(73) Assignee: Ford Global Technologies, LLC, Dearborn, MI (US)

( * ) Notice: Subject to any disclaimer, the term of this patent is extended or adjusted under 35 U.S.C. 154(b) by 230 days.

(21) Appl. No.: 16/953,565

(22) Filed: Nov. 20, 2020

(65) Prior Publication Data
US 2022/0161778 A1 May 26, 2022

(51) Int. Cl.
| | |
|---|---|
| *F02B 67/06* | (2006.01) |
| *B60W 10/30* | (2006.01) |
| *B60L 1/00* | (2006.01) |
| *B60L 58/12* | (2019.01) |
| *B60W 10/06* | (2006.01) |
| *F02P 5/14* | (2006.01) |
| *F02N 11/04* | (2006.01) |

(Continued)

(52) U.S. Cl.
CPC .............. *B60W 10/30* (2013.01); *B60L 1/003* (2013.01); *B60L 58/12* (2019.02); *B60W 10/06* (2013.01); *F02N 11/04* (2013.01); *F02P 5/14* (2013.01); *B60H 1/00735* (2013.01); *B60K 6/48* (2013.01); *B60W 2510/244* (2013.01); *B60W 2510/305* (2013.01); *B60W 2710/06* (2013.01); *B60W 2710/305* (2013.01)

(58) Field of Classification Search
CPC ..... B60K 6/48; B60K 2006/268; F02N 11/04; B60W 10/30; B60W 10/06; B60L 58/12; B60L 1/003; F02P 5/14
See application file for complete search history.

(56) References Cited

U.S. PATENT DOCUMENTS

| | | | |
|---|---|---|---|
| 8,209,104 B2 * | 6/2012 | Soejima ................ | F02P 5/1504 477/109 |
| 8,808,124 B2 * | 8/2014 | Major .................... | B60K 25/00 180/65.265 |
| 9,074,656 B2 * | 7/2015 | Benz ...................... | F02N 11/04 |

(Continued)

FOREIGN PATENT DOCUMENTS

| | | |
|---|---|---|
| CN | 102678312 | 9/2012 |
| CN | 105313667 | 2/2016 |

*Primary Examiner* — Gonzalo Laguarda
(74) *Attorney, Agent, or Firm* — David B Kelley; Brooks Kushman P.C.

(57) ABSTRACT

A vehicle includes an air-conditioning (AC) compressor, an engine, a belt-integrated starter generator (BISG), and a controller. The controller, responsive to detecting a first AC compressor engagement condition, compares a first AC torque demand that is required to engage the AC compressor with an available torque from the BISG. The controller further, responsive to the available torque being insufficient to engage the AC compressor, engages the AC compressor using the available torque from the BISG and an engine torque from the engine to compensate a torque shortfall between the AC torque demand and the available torque by retarding spark timing and increasing air intake.

12 Claims, 2 Drawing Sheets

(51) Int. Cl.
*B60H 1/00* (2006.01)
*B60K 6/48* (2007.10)

(56) References Cited

U.S. PATENT DOCUMENTS

| | | |
|---|---|---|
| 9,102,225 B2 | 8/2015 | Major et al. |
| 10,676,079 B1 * | 6/2020 | Bucknor ............... B60W 20/10 |
| 10,781,752 B2 * | 9/2020 | Kikkawa ............... F01D 15/005 |
| 2009/0255741 A1 * | 10/2009 | Major ...................... B60K 6/48 |
| | | 474/84 |

* cited by examiner

VEHICLE AIR CONDITIONING TORQUE RESERVE VIA BELT INTEGRATED STARTER GENERATOR

TECHNICAL FIELD

The present disclosure generally relates to a vehicle system for providing a torque to an air-conditioning (AC) compressor.

BACKGROUND

Vehicles that include internal combustion engines may also include air-conditioning compressors and belt-integrated starter generators.

SUMMARY

A vehicle includes an air-conditioning (AC) compressor having a shaft, an engine, a belt-integrated starter generator (BISG), and a controller. The controller, responsive to a request for torque from the AC compressor, an available torque from the BISG being insufficient to satisfy the request, and an absence of demand for negative torque to decelerate the vehicle, mechanically couple the BISG and engine to the shaft and retard spark timing of the engine. The controller further, responsive to the request, the available torque being sufficient to satisfy the request, and the absence of the demand, mechanically couple the BISG to the shaft without retarding the spark timing of the engine.

A method for controlling a powertrain of a vehicle includes, responsive to a request for torque from an air-conditioning (AC) compressor, an available torque from a belt-integrated starter generator (BISG) being insufficient to satisfy the request, and an absence of demand for negative torque to decelerate the vehicle, mechanically couple the BISG and an engine to a shaft of the AC compressor and retard spark timing of the engine. The method further includes responsive to the request, the available torque being sufficient to satisfy the request, and the absence of the demand, mechanically couple the BISG to the shaft without retarding the spark timing of the engine.

A control system for a powertrain includes one or more controllers that, responsive to a request for torque from an air-conditioning (AC) compressor, an available torque of a belt-integrated starter generator (BISG) being sufficient to satisfy the request, and an absence of demand for negative torque to decelerate the powertrain, command transfer of the available torque to the AC compressor, and responsive to a request for torque from an air-conditioning (AC) compressor, an available torque of a belt-integrated starter generator (BISG) being sufficient to satisfy the request, and a presence of the demand, mechanically couple a crankshaft of an engine to a shaft of the AC compressor with commanding transfer of the available torque to the AC compressor.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

A vehicle AC compressor may be mechanically coupled to a vehicle engine and/or motor via a belt/gear. When the AC compressor is engaged, the engine speed may reduce for a short period of time due to the additional load. To compensate for the additional load, a vehicle controller may apply a calibrated AC engine torque reserve on top of the immediate torque need by opening the throttle and delaying spark time.

Figure 1:
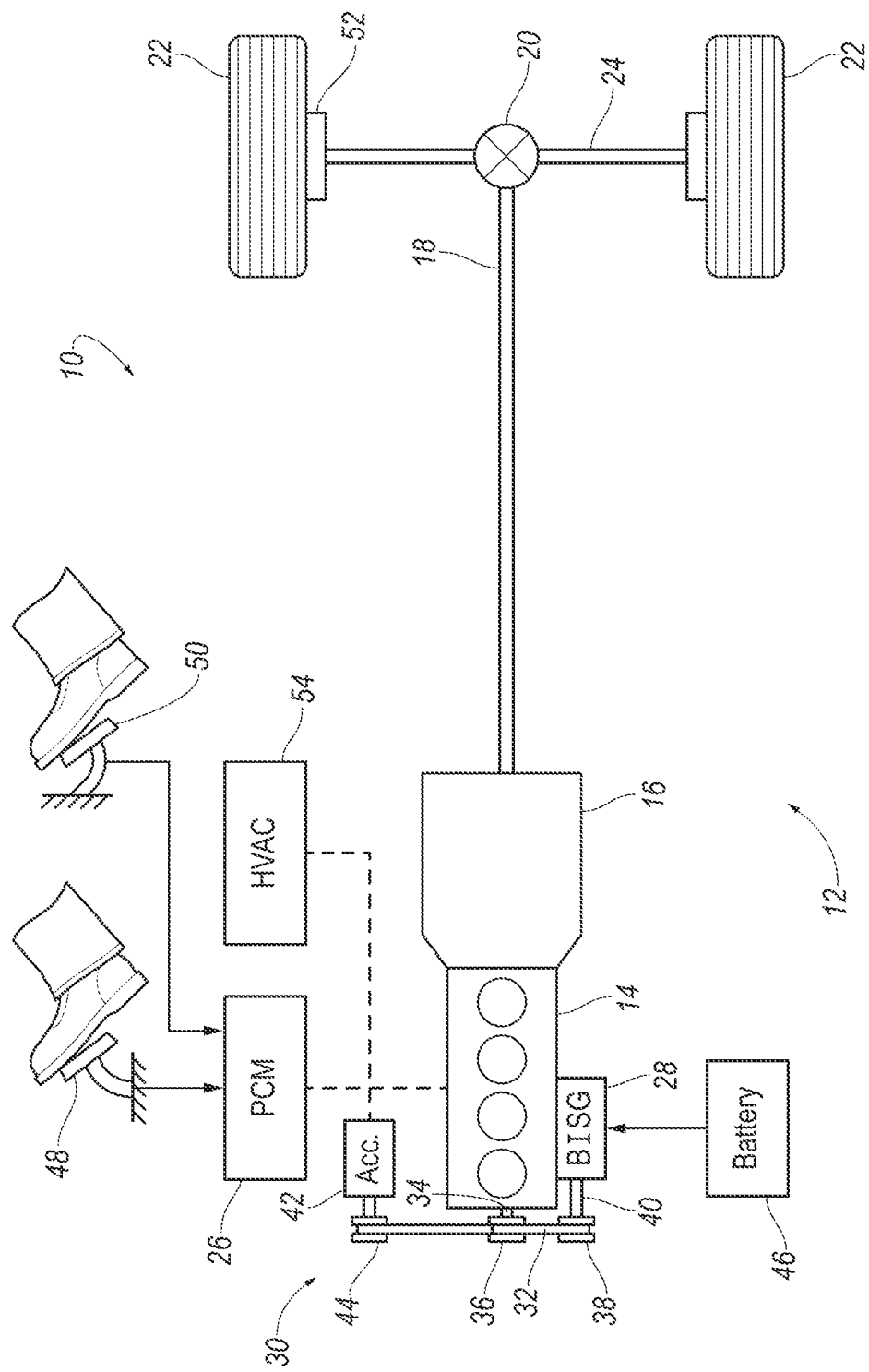
FIG. 1 illustrates a schematic diagram of a mild-hybrid electric vehicle.

Referring to FIG. 1, a schematic diagram of a mild-hybrid electric vehicle (MHEV) 10 is illustrated according to an embodiment of the present disclosure. The vehicle 10 includes a powertrain 12. The powertrain 12 may include an engine 14 that drives a transmission 16, e.g., a multiple step-ratio automatic transmission. The engine 14 may be an internal combustion engine fueled by gasoline, diesel, or natural gas, etc. The output of the transmission 16 may be coupled to a driveshaft 18 that transmits torque to a differential 20. The differential 20 may distribute torque to wheels 22 via shafts 24. The example vehicle 10 is shown as rear-wheel drive, but may be front-wheel drive, all-wheel drive, or four-wheel drive in other embodiments.

The powertrain 12 may further include an associated controller 26 such as a powertrain control module (PCM). While illustrated as one controller, the controller 26 may be part of a larger control system and may be controlled by various other controllers throughout the vehicle 10, such as a vehicle system controller (VSC). It should therefore be understood that the PCM 26 and one or more other controllers can collectively be referred to as a "controller" that controls various actuators in response to signals from various sensors to control functions such as operating the engine 14, operating the transmission 16, operating an electric machine, etc. The controller 26 may include a microprocessor or central processing unit (CPU) in communication with various types of computer readable storage devices or media. Computer readable storage devices or media may include volatile and nonvolatile storage in read-only memory (ROM), random-access memory (RAM), and keep-alive memory (KAM), for example, KAM is a persistent or non-volatile memory that may be used to store various operating variables while the CPU is powered down. Computer-readable storage devices or media may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller in controlling the engine or vehicle.

The controller 26 may communicate with various engine/vehicle sensors and actuators via an input/output (I/O) interface (including input and output channels) that may be implemented as a single integrated interface that provides various raw data or signal conditioning, processing, and/or conversion, short-circuit protection, and the like. Alternatively, one or more dedicated hardware or firmware chips may be used to condition and process particular signals before being supplied to the CPU. The controller 26 may communicate signals to and/or from the engine 14, the transmission 16, etc. Although not explicitly illustrated, those of ordinary skill in the art will recognize various functions or components that may be controlled by the controller 26 within each of the subsystems identified above. Representative examples of parameters, systems, and/or components that may be directly or indirectly actuated using control logic and/or algorithms executed by the controller 26 include fuel injection timing, rate, and duration, throttle-valve position, spark plug ignition timing (for spark-ignition engines), intake/exhaust valve timing and duration, front-end accessory drive (FEAD) components such as an alternator, air conditioning compressor, battery charging or discharging (including determining the maximum charge and discharge power limits), regenerative braking, electric machine operation, clutches, and the like. Sensors communicating input through the I/O interface may be used to indicate turbocharger boost pressure, crankshaft position, engine rotational speed (RPM), wheel, vehicle speed, coolant temperature, intake manifold pressure, accelerator-pedal position, ignition switch position, throttle-valve position, air temperature, exhaust gas oxygen or other exhaust gas component concentration or presence, intake air flow, transmission gear, ratio, or mode, transmission oil temperature, transmission turbine speed, torque converter bypass clutch status, battery temperature, voltage, current, or state of charge (SOC) for example.

The vehicle 10 may include a BISG 28 (sometimes called a motor/generator) that is connected to FEAD 30. The BISG 28 generally may replace the alternator. The BISG 28 may be an electric machine configured to act as a motor and/or a generator. The BISG 28 may be a three-phase electric motor. The FEAD 30 may include a tension member, e.g., a belt 32, that operably couples the BISG 28 to crankshaft 34 of the engine 14. For example, the engine 14 may include an associated pulley 36 that is supported on the crankshaft 34 and the BISG 28 may include an associated pulley 38 that is supported on a shaft 40 of the BISG 26. The shaft 40 may be fixed to the rotor of the BISG 26 and may be referred to as a rotor shaft. The belt 32 may be trained over these pulleys so that torque can be transmitted between the engine 14 and the electric machine 28. One or more accessories 42 may include pulleys, generally illustrated as pulley 44, that are also engaged with the belt 32, or with a second belt that connects to the crankshaft 34. For instance, the accessories may include an AC compressor configured to enable circulation of refrigerant in a refrigeration line (not shown) and achieve a desired temperature in the vehicle cabin. The FEAD 30 may include a single belt or multiple belts. The FEAD 30 allows the accessories to be powered by the engine 14, the BISG 28, or a combination thereof.

The BISG 28 may be electrically connected to a battery 46. The battery 46 may be a high-voltage or a low-voltage battery. For example, the battery 44 and the BISG 28 may be part of a 12V, and/or 48V electrical system. The BISG 28 may be connected to the battery 46 and other vehicle electrical systems though power electronics (not shown). The BISG 28 may be configured to operate as a motor to start the engine 14 during an engine start-up event, or to provide additional torque to the powertrain 12 during vehicle operations. The BISG 28 may also be configured to receive torque from the engine 14 and operate as a generator to recharge the battery 46 and power electrical loads of the vehicle 10. The BISG 28 may further be configured to perform regenerative braking. In the regenerative mode, the BISG 28 may receive torque from the engine 14 to reduce the engine and vehicle speed. The controller 26 may be configured to transmit signals to the BISG 28 to operate the BISG 28 as either a motor or a generator. The BISG 28 may be configured to provide electrical energy to charge the battery 46 or provide electrical energy to power the vehicle accessories when operating as a generator.

An accelerator pedal 48 may be used by the driver of the vehicle 10 to provide a demanded torque, power, or drive command (herein "driver-demanded torque") to propel the vehicle 10. In general, depressing and releasing the accelerator pedal 48 generates an accelerator-pedal position signal that may be interpreted by the controller 26 to determine the driver-demanded torque. A brake pedal 50 may be also used by the driver of the vehicle 10 to provide a demanded braking torque to slow the vehicle 10. In general, depressing and releasing the brake pedal 50 generates a brake-pedal position signal that may be interpreted by the controller 26 as a demand to decrease the vehicle speed. Based upon inputs from the accelerator pedal 48 and brake pedal 48, the controller 26 may command torque to the engine 14, the BISG 28, and friction brakes 52. The controller 26 may be programmed to arbitrate the driver-demanded torque between the engine 14 and BISG 28, and to arbitrate the braking torque between the regenerative braking via the BISG 28 and friction brakes 52.

Depending upon the size of the vehicle 10 and the power rating of the BISG 28, the vehicle 10 may be propelled, at least at low speeds, by either the engine 14 or BISG 28. For example, the vehicle 10 may include an electric creep mode in which the BISG 28 propels the vehicle 10 when the engine 14 is OFF. Creep, in one example, refers to movement of the vehicle 10 when both the brake pedal 50 and accelerator pedal 46 are released. Typical creep speeds are less than 10 miles per hour. In other situations, both the engine 14 and BISG 28 may act as drive sources to propel the vehicle 10. The engine 14 generates engine power at the crankshaft 34 that is added with power output from the BISG 28 through the FEAD 30. This combined power may be then sent to the driven wheels 22 though the transmission 16 and the drivetrain.

The BISG 28 may be further configured to provide a torque reserve during the engagement of the AC compressor 42 by applying a torque to the pully 44 via the FEAD 30. The engagement of AC compressor 42 may be manually triggered by a user input via an interface (e.g., a button, not shown). Additionally, or alternatively, the engagement of the AC compressor may be automatically triggered by a heating ventilation air conditioning (HVAC) controller 54 controlling the operations of the AC compressor using data received from various vehicle sensors. For instance, the HVAC controller 54 may be configured to automatically disengage and engage the AC compressor 42 responsive to one or more predefined conditions being met. Upon the vehicle cabin temperature/humidity reaching a desired level measured via a temperature sensor (not shown), the HVAC controller 54 may disconnect the AC compressor 42 from the pulley 44 by disengaging an AC clutch (lockup clutch, not shown) integrated with the AC compressor 42 to reduce the load on the FEAD 30, while keeping a blower fan (not shown) running. Upon the vehicle cabin temperature/humidity reaching an undesired level, the HVAC controller 54 may engage the AC clutch to connect compressor 42 to the FEAD 30 so that the AC compressor 42 may start to rotate and circulate the refrigerant. Alternatively, the AC compressor may be provided with multiple speed features adjustable by HVAC controller 54 based on sensor data and user demand. A low speed/power mode may be selected when the AC cooling demand is low and/or the difference between the ambient temperature and desired temperature is small. A high speed/power mode may be selected when the AC cooling demand is high and/or the difference between the ambient temperature and the desired temperature is great.

Responsive to detecting the AC compressor 42 is to be engaged, the PCM 26 may determine an AC torque demand to engage the AC compressor 42 and compensate the AC torque demand by outputting a torque via the BISG 28 to minimize the additional load to the engine 14. The AC torque demand may depend on various factors such as a compressor pressure, the ambient temperature, an engine speed or the like. The PCM 26 may adjust the BISG torque output to the FEAD 30 based on those factors while considering vehicle component hardware restrictions. In case that the available BISG torque is insufficient to satisfy the AC torque demand, the PCM 26 may provide the shortfall torque demand from the engine 14.

Figure 2:
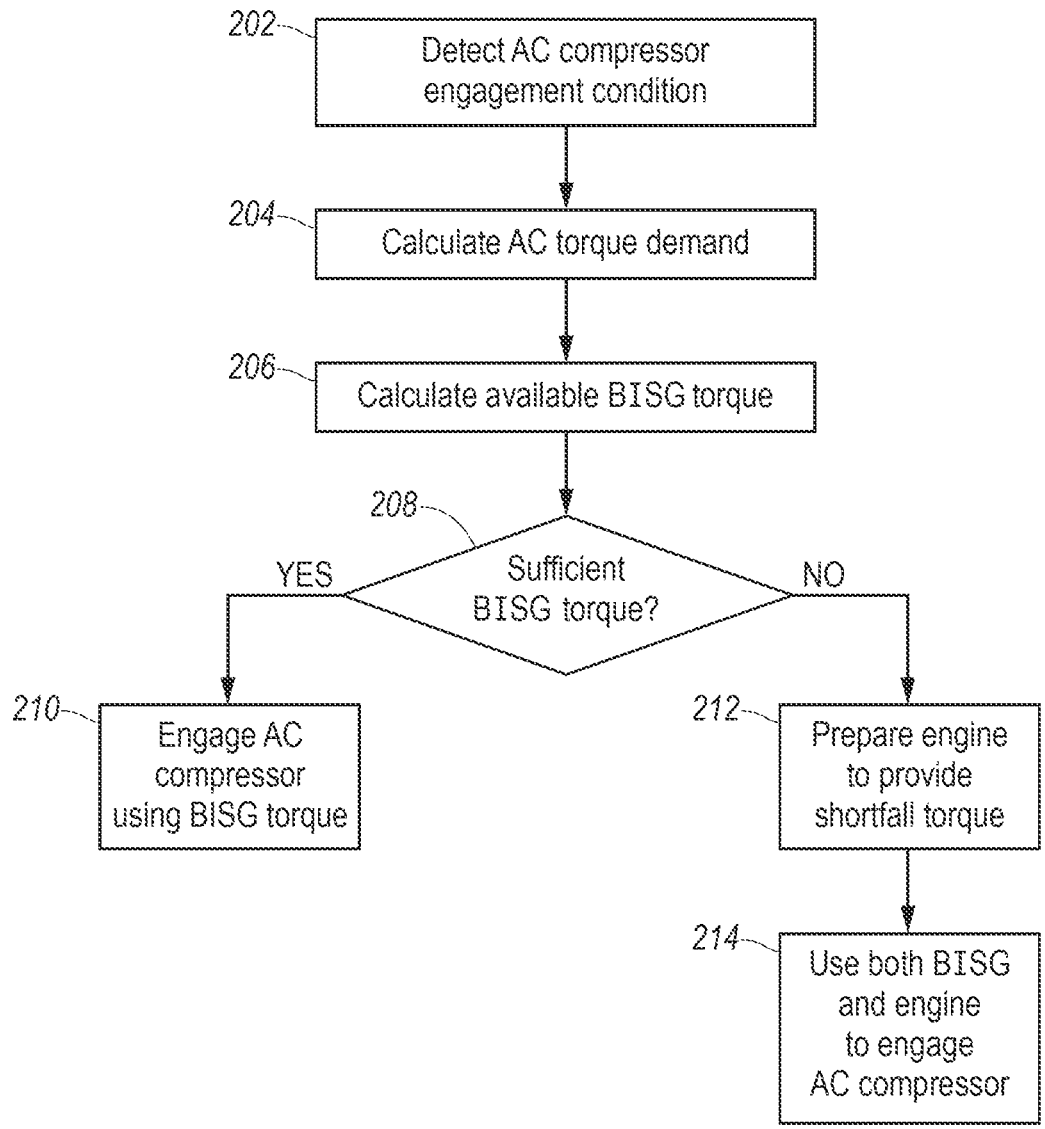
FIG. 2 illustrates a flow diagram of process for AC compressor engagement.

Referring to FIG. 2, a flow diagram for a process 200 for engaging an AC compressor is illustrated. With continuing reference to FIG. 1, at operation 202 the PCM 26 detects whether a predefined condition for the AC compressor 42 to engage is met. The predefined condition may be a signal indicative of an intent to engage the AC compressor 42 received from the HVAC controller 54 as discussed above. In response the PCM 26 calculates a torque demand for the AC compressor to engage. The calculation may be based on various factors. For instance, the PCM 26 may use a pressure of the AC system measured via a pressure sensor (not shown) to calculate the torque demand. In general, the torque demand may be inversely proportional to the pressure of the AC system. In other words, a higher pressure in the AC system may generally require less torque to engage the AC compressor 42 whereas a lower pressure in the AC system may require more torque to engage the AC compressor 42. The PCM 26 may further calculate the torque demand using an ambient temperature of the vehicle 10. A higher ambient temperature may generally require more torque whereas a lower ambient temperature may require less torque to engage the AC compressor 42. The torque demand may be further dependent upon a desired compressor speed/power based on the requirement from the HVAC controller 54. The low speed mode may require less torque and the high speed mode may require more torque to engage the AC compressor 42.

At operation 206, the PCM 26 calculates an available BISG torque output to accommodate the AC torque demand. The BISG 28 may be provided with a default output torque which may be adjusted by various factors (described above) for available torque output. For instance, the available torque may be calculated based on the state of charge (SOC) of the battery 46 when the torque is needed. In general, more torque may be output by the BISG 28 when the battery 46 is fully or sufficiently charged, and less torque is available when the battery 46 is low on charge. The available torque may be further dependent on other factors such as operating temperature, speed, power, current, and/or voltage of the BISG 28 to ensure that the available torque output will not violate any hardware constraints of the BISG 28, the FEAD 30, as well as any other related components of the vehicle 10. The available BISG torque may further depend on torque demand from other components of the vehicle 10. For instance, a positive torque (not including the AC torque) may be demanded to propel the vehicle 10 during acceleration and a negative torque may be demanded to decelerate the vehicle 10 during a braking event. In the regenerative mode when a negative torque is demanded, the PCM 26 may balance the negative torque demand to decelerate with the positive AC torque demand to engage the AC compressor 42. In other words, the PCM 26 may use the kinetic energy in the FEAD 30 to at least partially engage the AC compressor 42 without providing the full AC torque demand via the BISG 28. In this case, the BISG 28 may output zero torque when the negative torque and AC torque are substantially equal. The BISG 28 may output a positive torque to compensate the shortfall when the magnitude of AC torque demand is more than the magnitude of the negative torque demand. The BISG 28 may even output a negative torque when the negative torque demand outweighs the AC torque demand as calculated.

At operation 208, if the PCM determines that the available BISG torque is sufficient to engage the AC compressor 42 by comparing the available torque with the AC torque demand, the process proceeds to operation 210 and the PCM 26 engages the AC compressor 42 using the BISG 28 alone. Otherwise, the process proceeds to operation 212 and the PCM 26 prepares the engine 14 to provide the torque shortfall. The PCM 26 may adjust the throttle opening, fuel injection, and/or ignition timing to provide the torque reserve to compensate the torque shortfall from the BISG 28. At operation 214. The PCM 26 engages the AC compressor using the torque from both the BISG 28 and the engine 14.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A vehicle comprising:
an air-conditioning (AC) compressor including a shaft;
an engine configured to be selectively mechanically coupled to the shaft;
a belt-integrated starter generator (BISG) configured to be selectively mechanically coupled to the shaft; and
a controller configured to,
responsive to a request for torque from the AC compressor, an available BISG torque from the BISG being insufficient to satisfy the request, and an absence of demand for negative torque from the engine to decelerate the vehicle, mechanically couple the BISG and engine to the shaft and retard spark timing of the engine,
responsive to the request, the available BISG torque being sufficient to satisfy the request, and the absence of the demand, mechanically couple the BISG to the shaft without retarding the spark timing of the engine while the engine is running, and
responsive to the request, the available BISG torque being sufficient to satisfy the request, and presence of the demand, wherein the demand exceeds a threshold value, mechanically couple the engine to the shaft without mechanically coupling the BISG to the shaft.

2. The vehicle of claim 1, wherein the controller is further configured to, responsive to the request, the available BISG torque being sufficient to satisfy the request, and presence of the demand, wherein the demand does not exceed the threshold value, mechanically couple the BISG and engine to the shaft.

3. The vehicle of claim 1, wherein the request depends on ambient temperature such that a torque value defined by the request is proportional to the ambient temperature.

4. The vehicle of claim 1, further comprising a battery configured to power the BISG, wherein the available BISG torque depends on a state-of-charge (SOC) of the battery such that the available BISG torque increases as the SOC increases.

5. The vehicle of claim 1, wherein the BISG is configured to generate electric power from motion of the engine for storage in the battery.

6. The vehicle of claim 1, wherein the controller is further programmed to responsive to the request, the available BISG torque being sufficient to satisfy the request, and presence of the demand, wherein the demand is lower than the threshold value, mechanically couple the BISG and engine to the shaft and retard spark timing of the engine.

7. A method for controlling a powertrain of a vehicle comprising:
responsive to a request for torque from an air-conditioning (AC) compressor, an available BISG torque from a belt-integrated starter generator (BISG) being insufficient to satisfy the request, and an absence of demand for negative torque from the engine to decelerate the vehicle, mechanically couple the BISG and an engine to a shaft of the AC compressor and retard spark timing of the engine,
responsive to the request, the available BISG torque being sufficient to satisfy the request, and the absence of the demand, mechanically couple the BISG to the shaft without retarding the spark timing of the engine, and
responsive to the request, the available BISG torque being sufficient to satisfy the request, and presence of the demand, wherein the demand exceeds a threshold value, mechanically couple the engine to the shaft without mechanically coupling the BISG to the shaft.

8. The method of claim 7 further comprising, responsive to the request, the available BISG torque being sufficient to satisfy the request, and presence of the demand, wherein the demand does not exceed the threshold value, mechanically couple the BISG and engine to the shaft.

9. The method of claim 7, wherein the request depends on ambient temperature such that a torque value defined by the request is proportional to the ambient temperature.

10. The method of claim 7, wherein the available BISG torque depends on a state-of-charge (SOC) of a battery such that the available BISG torque increases as the SOC increases.

11. A control system for a powertrain, comprising
one or more controllers configured to,
responsive to a request for torque from an air-conditioning (AC) compressor, an available BISG torque of a belt-integrated starter generator (BISG) being sufficient to satisfy the request, and an absence of demand for negative torque to decelerate the powertrain, command transfer of the available BISG torque to the AC compressor, and
responsive to the request for torque, the available BISG torque of the BISG being sufficient to satisfy the request, and a presence of the demand, mechanically couple a crankshaft of an engine to a shaft of the AC compressor without commanding transfer of the available BISG torque to the AC compressor.

12. The control system of claim 11, wherein the request depends on ambient temperature such that a torque value defined by the request is proportional to the ambient temperature.

* * * * *